United States Patent
Nykerk et al.

(10) Patent No.: US 11,543,097 B2
(45) Date of Patent: Jan. 3, 2023

(54) LIT IMAGE PROJECTION DEVICES AND LAMP ASSEMBLIES CONTAINING THE SAME FOR GENERATION OF THREE DIMENSIONAL IMAGES

(71) Applicant: Flex-N-Gate Advanced Product Development, LLC, Tecumseh (CA)

(72) Inventors: Todd M. Nykerk, Holland, MI (US); Lester R. Sullivan, Wyoming, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 16/309,765

(22) PCT Filed: Jun. 13, 2017

(86) PCT No.: PCT/US2017/037283
§ 371 (c)(1),
(2) Date: Dec. 13, 2018

(87) PCT Pub. No.: WO2017/218555
PCT Pub. Date: Dec. 21, 2017

(65) Prior Publication Data
US 2019/0309924 A1    Oct. 10, 2019

Related U.S. Application Data

(60) Provisional application No. 62/349,368, filed on Jun. 13, 2016.

(51) Int. Cl.
*F21S 43/40*    (2018.01)
*F21S 43/14*    (2018.01)
(Continued)

(52) U.S. Cl.
CPC ............ *F21S 43/40* (2018.01); *B60Q 1/2696* (2013.01); *F21S 43/14* (2018.01); *F21S 43/26* (2018.01);
(Continued)

(58) Field of Classification Search
CPC .. F21S 43/40; F21S 43/14; F21S 43/31; F21S 43/26; B60Q 1/2696
See application file for complete search history.

(56) References Cited

U.S. PATENT DOCUMENTS 5,068,768 A * 11/1991 Kobayashi ............ F21S 41/635
362/268
6,045,245 A * 4/2000 Kanou .................... F21S 43/30
362/348

(Continued)

OTHER PUBLICATIONS

International Searching Authority, International Search Report, PCT/US2017/037283, dated Aug. 17, 2017.
(Continued)

*Primary Examiner* — Elmito Breval
*Assistant Examiner* — Nathaniel J Lee
(74) *Attorney, Agent, or Firm* — Reichel Stohry Dean LLP; Mark C. Reichel; Natalie J. Dean

(57) ABSTRACT

Lit image projection devices and lamp assemblies containing the same for generation of three dimensional images. A projection device of the present disclosure comprises one or more light sources, a rippled substrate defining a reflective surface, the reflective surface configured to reflect light source light from the one or more light sources as reflected light, and a first lenticular lens configured to receive the reflected light from the reflective surface, wherein the reflected light received by the first lenticular lens generates a three-dimensional lit image.

20 Claims, 5 Drawing Sheets

(51) Int. Cl.
  *F21S 43/31*  (2018.01)
  *F21S 43/20*  (2018.01)
  *B60Q 1/26*  (2006.01)
  *F21Y 115/10* (2016.01)
  *F21W 103/60* (2018.01)

(52) U.S. Cl.
  CPC .......... *F21S 43/31* (2018.01); *B60Q 2400/50* (2013.01); *F21W 2103/60* (2018.01); *F21Y 2115/10* (2016.08)

(56) References Cited

U.S. PATENT DOCUMENTS

| | | | |
|---|---|---|---|
| 6,234,646 B1 * | 5/2001 | Ito ........................... | F21S 43/14 362/241 |
| 6,386,743 B1 | 5/2002 | Futami et al. | |
| 6,814,475 B2 * | 11/2004 | Amano ................... | F21S 43/14 362/240 |
| 6,871,982 B2 | 3/2005 | Holman et al. | |
| 6,953,265 B2 | 10/2005 | Suehiro et al. | |
| 7,400,439 B2 | 7/2008 | Holman | |
| 7,878,690 B2 | 2/2011 | Kawato et al. | |
| 2008/0175015 A1 * | 7/2008 | Goncalves ................ | F21V 7/09 362/268 |

OTHER PUBLICATIONS

International Searching Authority, Written Opinion of the International Searching Authority, PCT/US2017/037283, dated Aug. 17, 2017.

\* cited by examiner

LIT IMAGE PROJECTION DEVICES AND LAMP ASSEMBLIES CONTAINING THE SAME FOR GENERATION OF THREE DIMENSIONAL IMAGES

PRIORITY

The present application is related to, claims the priority benefit of, and is U.S. 35 U.S.C. 371 national stage patent application of, International Patent Application Serial No. PCT/US2017/037283, filed Jun. 13, 2017, which is related to, and claims the priority benefit of, U.S. Provisional Patent Application Ser. No. 62/349,368, filed Jun. 13, 2016. The contents of each of the aforementioned applications are incorporated herein by reference and directly in their entirety.

BACKGROUND

The design of the exterior lighting components of automobiles plays an important role in the styling and marketing of vehicles in the automotive market. Vehicle designers are interested in technologies that can both provide the required regulatory functions of automotive exterior lighting and enable a unique and aesthetically pleasing lit and unlit appearance of the lighting components on the vehicle. There is also a desire to create uniformity and continuity in the lit appearance of functionally separate lamps that may be in close proximity to one another, for instance, a corner tail lamp relative to an applique or lift gate lamps. Therefore, there remains a significant need for the apparatuses, methods, and systems disclosed herein useful to generate the desired lit images.

BRIEF SUMMARY

In an exemplary embodiment of a projection device of the present disclosure, the projection device comprises one or more light sources, wherein a plurality of light sources comprises an array of light sources; a rippled substrate defining a reflective surface, the reflective surface configured to reflect light source light from the one or more light sources as reflected light; and one or more lenticular lenses, configured to receive the reflected light from the reflective surface; wherein the reflected light received by the one or more lenticular lenses generates a three-dimensional lit image.

In an exemplary embodiment of a projection device of the present disclosure, the three-dimensional lit image appears as lightning.

In an exemplary embodiment of a projection device of the present disclosure, the projection device comprises part of a lamp assembly.

In an exemplary embodiment of a projection device of the present disclosure, the lamp assembly further comprises a housing an outer lens, wherein in the housing and outer lens define an inner volume, and wherein at least part of the projection device is positioned within the inner volume.

In an exemplary embodiment of a projection device of the present disclosure, the one of more lenticular lenses each comprise/define a plurality of flute optics or flutes.

In an exemplary embodiment of a projection device of the present disclosure, the flute optics or flutes have a convex shape.

The present disclosure includes disclosure of a projection device, as shown and/or described herein.

The present disclosure also includes disclosure of a lamp assembly, as shown and/or described herein.

The present disclosure also includes disclosure of a method to generate a three-dimensional lit image, as shown and/or described herein.

In an exemplary embodiment of a projection device of the present disclosure, the projection device comprises one or more light sources; a rippled substrate defining a reflective surface, the reflective surface configured to reflect light source light from the one or more light sources as reflected light; and a first lenticular lens configured to receive the reflected light from the reflective surface; wherein the reflected light received by the first lenticular lens generates a three-dimensional lit image.

In an exemplary embodiment of a projection device of the present disclosure, the three-dimensional lit image appears as lightning.

In an exemplary embodiment of a projection device of the present disclosure, the projection device comprises part of a lamp assembly.

In an exemplary embodiment of a projection device of the present disclosure, the lamp assembly further comprises a housing and an outer lens, wherein the housing and outer lens define an inner volume and wherein at least part of the projection device is positioned within the inner volume.

In an exemplary embodiment of a projection device of the present disclosure, the three-dimensional lit image is present or perceived within the housing.

In an exemplary embodiment of a projection device of the present disclosure, the lamp assembly is configured as a vehicle lamp assembly.

In an exemplary embodiment of a projection device of the present disclosure, the first lenticular lens comprises or defines a plurality of flute optics or flutes.

In an exemplary embodiment of a projection device of the present disclosure, the flute optics or flutes have a convex shape.

In an exemplary embodiment of a projection device of the present disclosure, the one or more light sources comprises an array of light sources.

In an exemplary embodiment of a projection device of the present disclosure, the one or more light sources comprise one or more light-emitting diodes.

In an exemplary embodiment of a projection device of the present disclosure, the rippled substrate comprises one or more ripples or waves therein, existing in a first direction and an opposite second direction.

In an exemplary embodiment of a projection device of the present disclosure, the projection device further comprises a second lenticular lens configured to receive the reflected light from the reflective surface, wherein the reflected light received by the first lenticular lens and the second lenticular lens generates the three-dimensional lit image.

In an exemplary embodiment of a projection device of the present disclosure, the projection device comprises part of a lamp assembly.

In an exemplary embodiment of a projection device of the present disclosure, the lamp assembly further comprises a housing and an outer lens, wherein the housing and outer lens define an inner volume and wherein at least part of the projection device is positioned within the inner volume.

In an exemplary embodiment of a projection device of the present disclosure, the three-dimensional lit image is present or perceived within the housing.

In an exemplary embodiment of a projection device of the present disclosure, the lamp assembly is configured as a vehicle lamp assembly.

In an exemplary embodiment of a projection device of the present disclosure, the second lenticular lens comprises or defines a plurality of flute optics or flutes.

In an exemplary embodiment of a projection device of the present disclosure, the flute optics or flutes have a convex shape.

In an exemplary embodiment of a projection device of the present disclosure, the one or more light sources is/are positioned in between the rippled substrate and one of the one or more lenticular lenses.

In an exemplary embodiment of a projection device of the present disclosure, the one or more light sources are positioned to direct light toward the rippled substrate.

In an exemplary embodiment of a projection device of the present disclosure, the projection device comprises an array of light sources; a rippled substrate defining a reflective surface, the reflective surface configured to reflect light source light from the array of light sources as reflected light; and one or more lenticular lenses configured to receive the reflected light from the reflective surface; wherein the reflected light received by the one or more lenticular lenses generates a three-dimensional lit image.

In an exemplary embodiment of a projection device of the present disclosure, the three-dimensional lit image appears as lightning.

In an exemplary embodiment of a projection device of the present disclosure, the array of light sources comprises one or more light-emitting diodes.

In an exemplary embodiment of a projection device of the present disclosure, the projection device comprises part of a lamp assembly.

In an exemplary embodiment of a projection device of the present disclosure, the lamp assembly further comprises a housing and an outer lens, wherein the housing and outer lens define an inner volume and wherein at least part of the projection device is positioned within the inner volume.

In an exemplary embodiment of a projection device of the present disclosure, the three-dimensional lit image is present or perceived within the housing.

In an exemplary embodiment of a projection device of the present disclosure, the lamp assembly is configured as a vehicle lamp assembly.

In an exemplary embodiment of a projection device of the present disclosure, the one or more lenticular lenses each comprise a plurality of flute optics or flutes, and wherein the flute or flute optics have a convex shape.

In an exemplary embodiment of a projection device of the present disclosure, the one or more light sources is/are positioned in between the rippled substrate and one of the one or more lenticular lenses.

In an exemplary embodiment of a projection device of the present disclosure, the one or more light sources are positioned to direct light toward the rippled substrate.

In an exemplary embodiment of a lamp assembly of the present disclosure, the lamp assembly comprises an exemplary projection device of the present disclosure.

In an exemplary embodiment of a lamp assembly of the present disclosure, the lamp assembly comprises a projection device, comprising one or more light sources; a rippled substrate defining a reflective surface, the reflective surface configured to reflect light source light from the one or more light sources as reflected light; and a first lenticular lens configured to receive the reflected light from the reflective surface; wherein the reflected light received by the first lenticular lens generates a three-dimensional lit image; a housing; and an outer lens coupled to the housing to define an inner volume, wherein at least part of the projection device is positioned within the inner volume.

In an exemplary embodiment of a lamp assembly of the present disclosure, the housing and the outer lens are structured to establish and maintain a relative distance between the one or more light sources and the first lenticular lens.

In an exemplary embodiment of a lamp assembly of the present disclosure, the first lenticular lens is welded to the housing using a sonic weld process, a vibration weld process, or a thermal tack process.

In an exemplary embodiment of a lamp assembly of the present disclosure, the rippled substrate comprises one or more ripples or waves therein, existing in a first direction and an opposite second direction.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
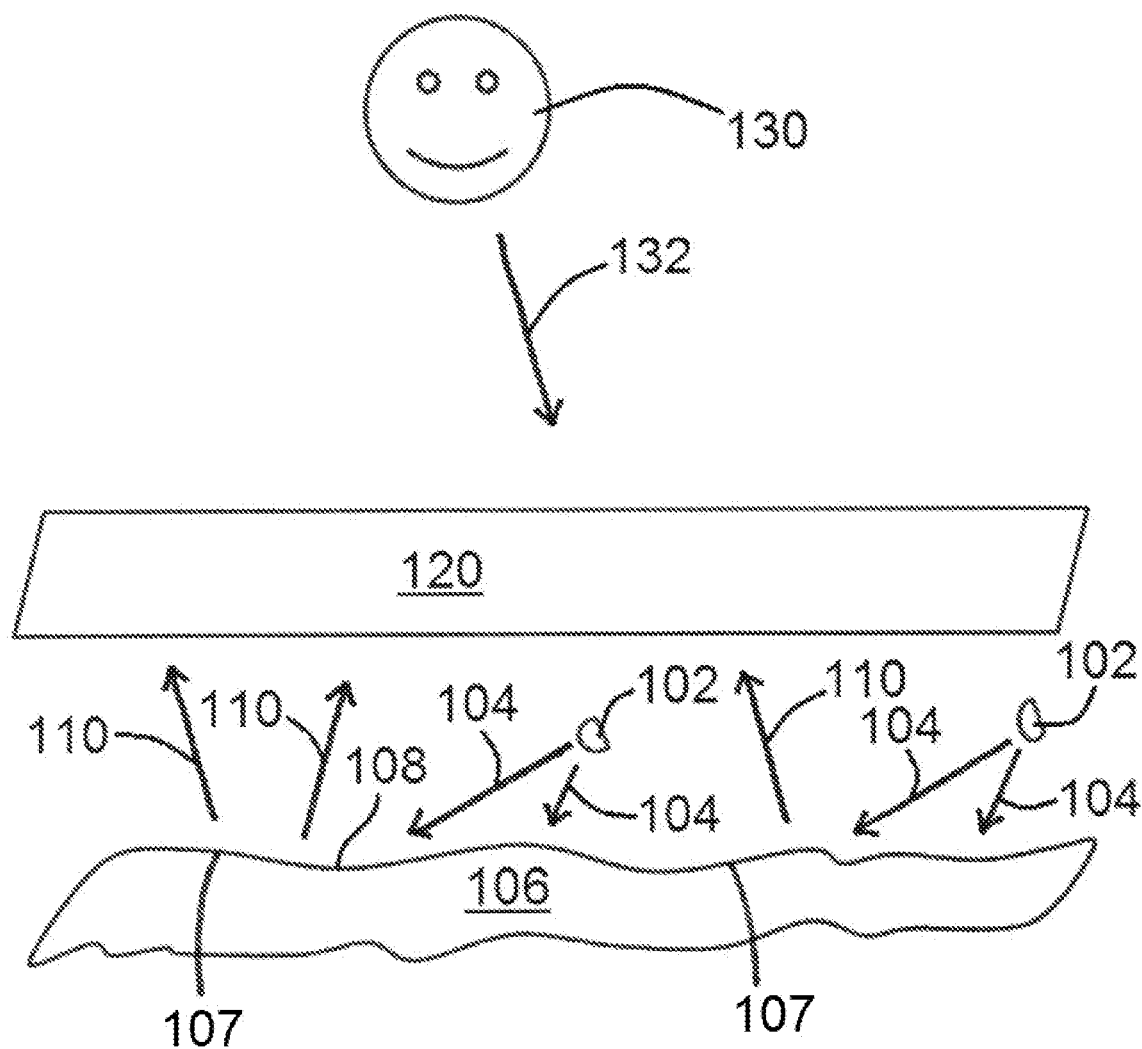
FIG. 1 shows elements of a projection device, according to an exemplary embodiment of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of various projection devices and methods of operating the same to generate a desired lit image, also referred to herein as a three-dimensional (3D) lit image.

Components of an exemplary projection device of the present disclosure are shown in FIG. 1. As shown in FIG. 1, an exemplary projection device 100 comprises one or more light sources 102, which, in various embodiments, may be/comprise light emitting diodes. Light sources 102, as shown in FIG. 1, are configured/positioned so to direct light emitted therefrom (identified as light source light 104 in FIG. 1) toward a rippled substrate 106 having/defining a reflective surface 108. Rippled substrate 106 is defined as comprising one or more ripples or waves 107 therein so to facilitate generation of virtual three-dimensional images 400 (3D images 400) of the present disclosure. Ripples or waves 107 are generally understood as to be curved portions of rippled substrate 106, existing in a first and an opposite second direction (such as in and out, up and down, front and back, etc.), so that ripples or waves 107 form rippled substrate 106 having reflective surface 108. Light source light 104 can be reflected from reflected surface 108 (identified as reflected light 110 in FIG. 1) in various directions, whereby at least some of the reflected light 110 is directed toward, and ultimately through, one or more lenticular lenses 120.

Figure 4:
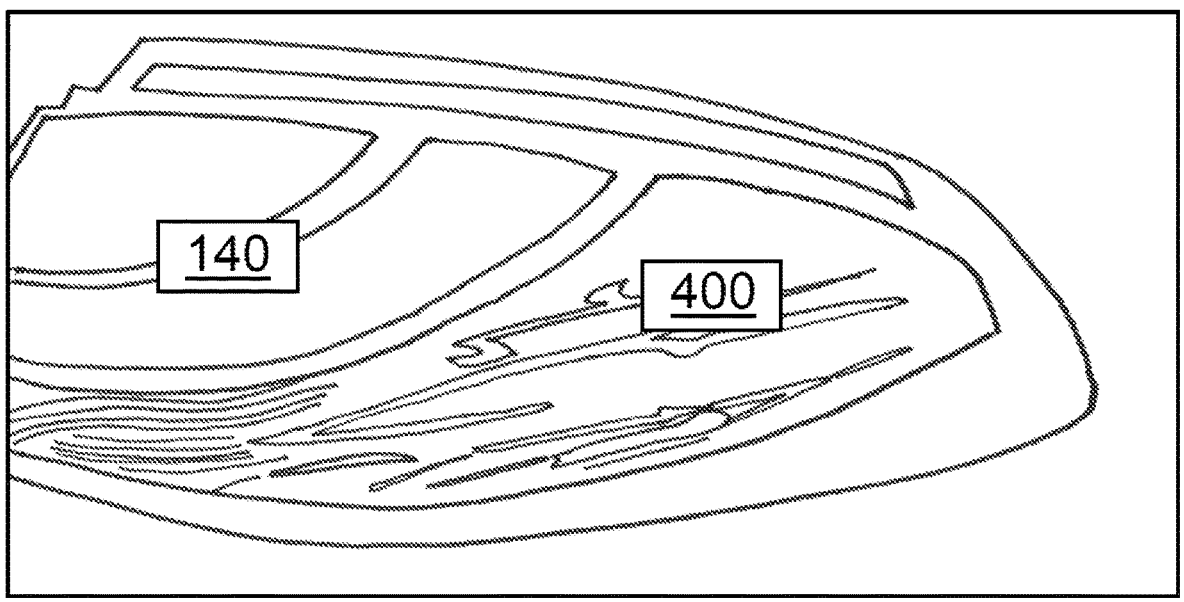
FIG. 4 shows a lamp assembly configured to generate a three-dimensional image appearing as lightning, according to an exemplary embodiment of the present disclosure.

Lenticular lenses 120, in at least some embodiments, generally comprise a plurality of convex flute optics or flutes 200 (shown in FIG. 2) arranged side by side such that the flutes 200 extend in the same direction, defining a longitudinal axis of the lens such that each flute 200 has an optical axis generally orthogonal to the longitudinal axis. The plurality of flutes 200 may enable a horizontal parallax, for example. Without being bound to a particular theory, exemplary projection devices 100 of the present disclosure uses a compound horizontal parallax enabled by the use of multiple lenticular lenses 120 to generate a 3D image 400, as shown in FIG. 4. The 3D image(s) 400 generated using projection devices 100 of the present disclosure can be viewed by a viewer 130 (a person, for example), looking in a direction toward projection device 100 and/or lamp assemblies 140 (discussed in further detail herein), such as shown via viewing direction arrow 132. The general directions of light source light 104 (from light source(s) 102 toward reflective surface 108 of rippled substrate 106, reflected light 110 from reflective surface 108 of rippled substrate 106, and viewing direction 132, are generally identified by the arrows shown in FIG. 1, for example.

Figure 2:
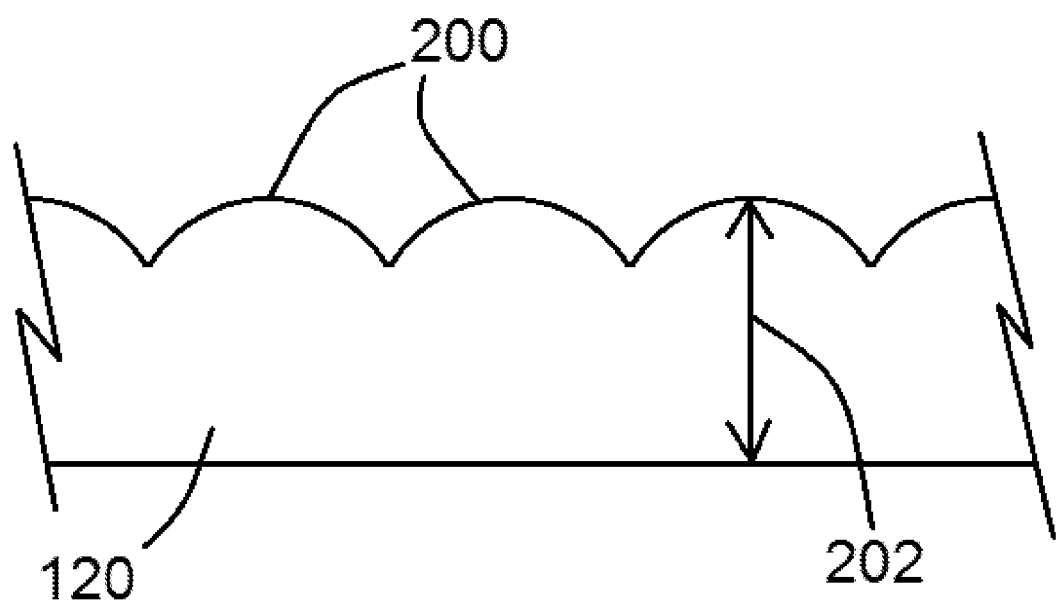
FIG. 2 shows flutes of a lenticular lens, according to an exemplary embodiment of the present disclosure.

FIG. 2 shows a cross-sectional view of portions of a plurality of flutes 200, depicting three full flutes 200 and two partial flutes 200 to either side. As shown in FIG. 2, lenticular lenses 120 may have a thickness 202, such as any suitable thickness 202 including, for example, 0.1-10 millimeters (mm). In certain embodiments, the thickness 202 of one or more lenticular lenses 120 may be between 1-3 mm. In at least one embodiment, the thickness 202 of lenticular lenses 120 may be 1 mm. In various embodiments, lenticular flutes 26 may be on opposite sides of the same lenticular lens 120.

Figure 3:
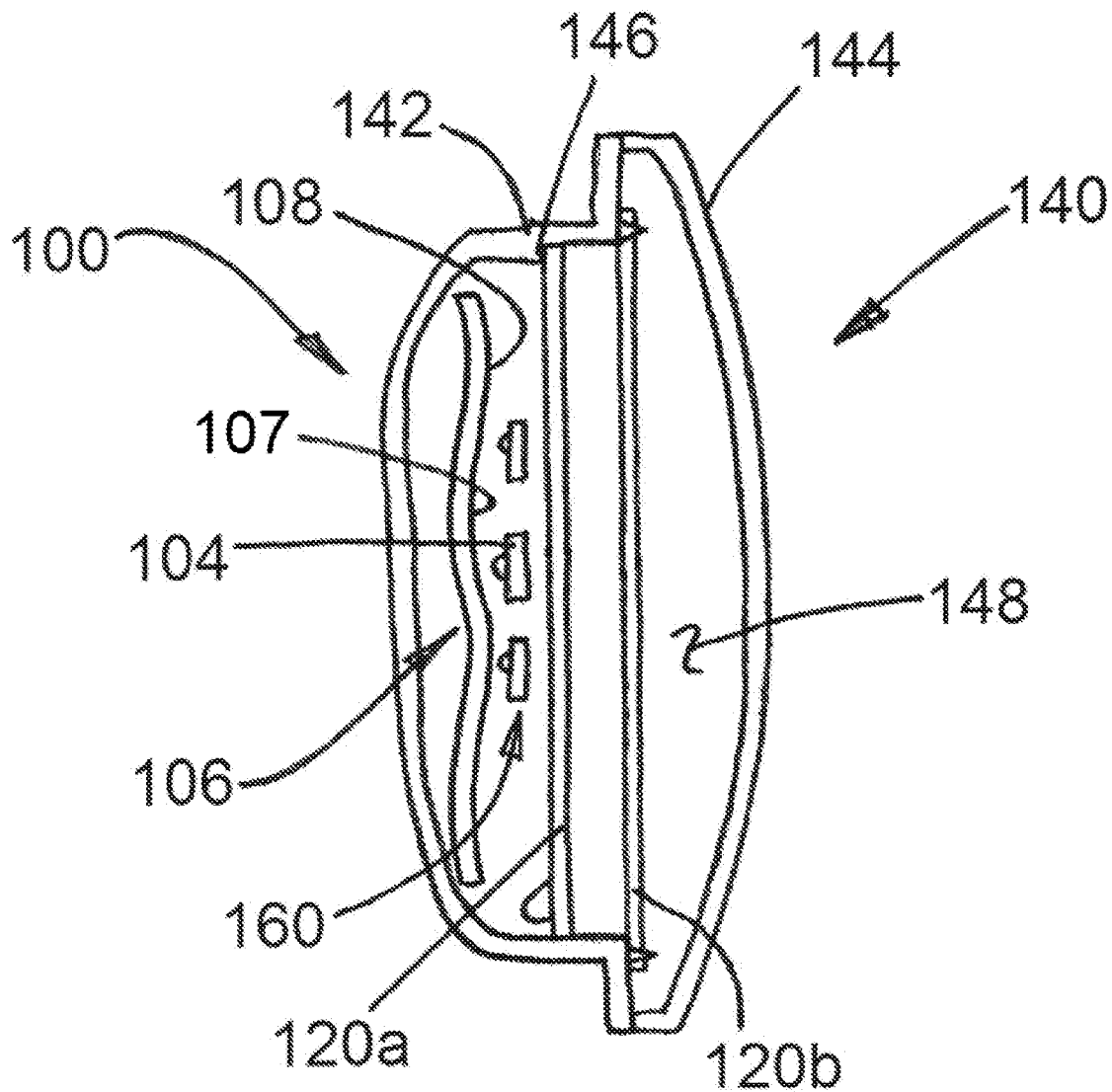
FIG. 3 shows a lamp assembly having two lenticular lenses, according to an exemplary embodiment of the present disclosure.

Exemplary projection devices 100 may be incorporated into lamp assemblies 140 as shown in FIG. 3. Exemplary lamp assemblies 140 of the present disclosure may include an outer lens 144 attached to a housing 142 to form a volume 148 therebetween. The housing 142 and/or outer lens 144 may be structured to secure and position the projection device 100 within the volume 148. The housing 142 and/or outer lens 144 may be structured to establish and maintain the relative distance between the light source 104 (or array 160 of more than one light source 104), a first lenticular lens 120 (identified as lenticular lens 120a in FIG. 3), and an optional second lenticular lens 120 (identified as lenticular lens 120b in FIG. 3). In at least one embodiment, the housing 142 may include one or more bosses 146 structured to positively locate the first lenticular lens 120a and/or the second lenticular lens 120b. In certain embodiments, the first lenticular lens 120a and/or the second lenticular lens 120b may be attached to the housing 142 by any suitable means. For example, the first lenticular lens 120a and/or the second lenticular lens 120b may be welded to the housing 142 using, without limitation, a sonic weld process, a vibration weld process, or thermal tack process. Alternatively or additionally, the first lenticular lens 120a and/or the second lenticular lens 120b may be attached to the housing 142 using an adhesive. In at least one embodiment, the housing 142, the outer lens 144, the first lenticular lens 120a, and/or the second lenticular lens 120b may be configured to trap the first lenticular lens 120a and/or the second lenticular lens 120b in the desired position without an additional means of attachment. One, two, three, or more lenticular lenses 120 can be used in various lamp assembly 140 embodiments of the present disclosure, as may be desired.

FIG. 3 also shows an exemplary relative positioning of a light source 104, or an array 160 of light sources 104, relative to one or more lenticular lenses 120 and a rippled substrate 106. In such an embodiment, for example, rippled substrate 106 is positioned at or near a relative back of housing 142, and light source 104, or an array of light sources 104, is/are positioned between rippled substrate 106 and a first lenticular lens 120 (shown as lenticular lens 120a in FIG. 3).

FIG. 4 shows a photograph of an exemplary lamp assembly 140 of the present disclosure, whereby 3D image 400 is shown, generated by way of light source light 104 from a light source 102 (or an array 160 of light sources 102), reflecting off of a reflective surface 108 of a rippled substrate 106 as reflected light 110, which is directed toward one or more lenticular lenses 120, so to generate said 3D image 400. As shown in FIG. 4, at least one 3D image 400 of the present disclosure is generated to look like (appear as) lightning.

Figure 5:
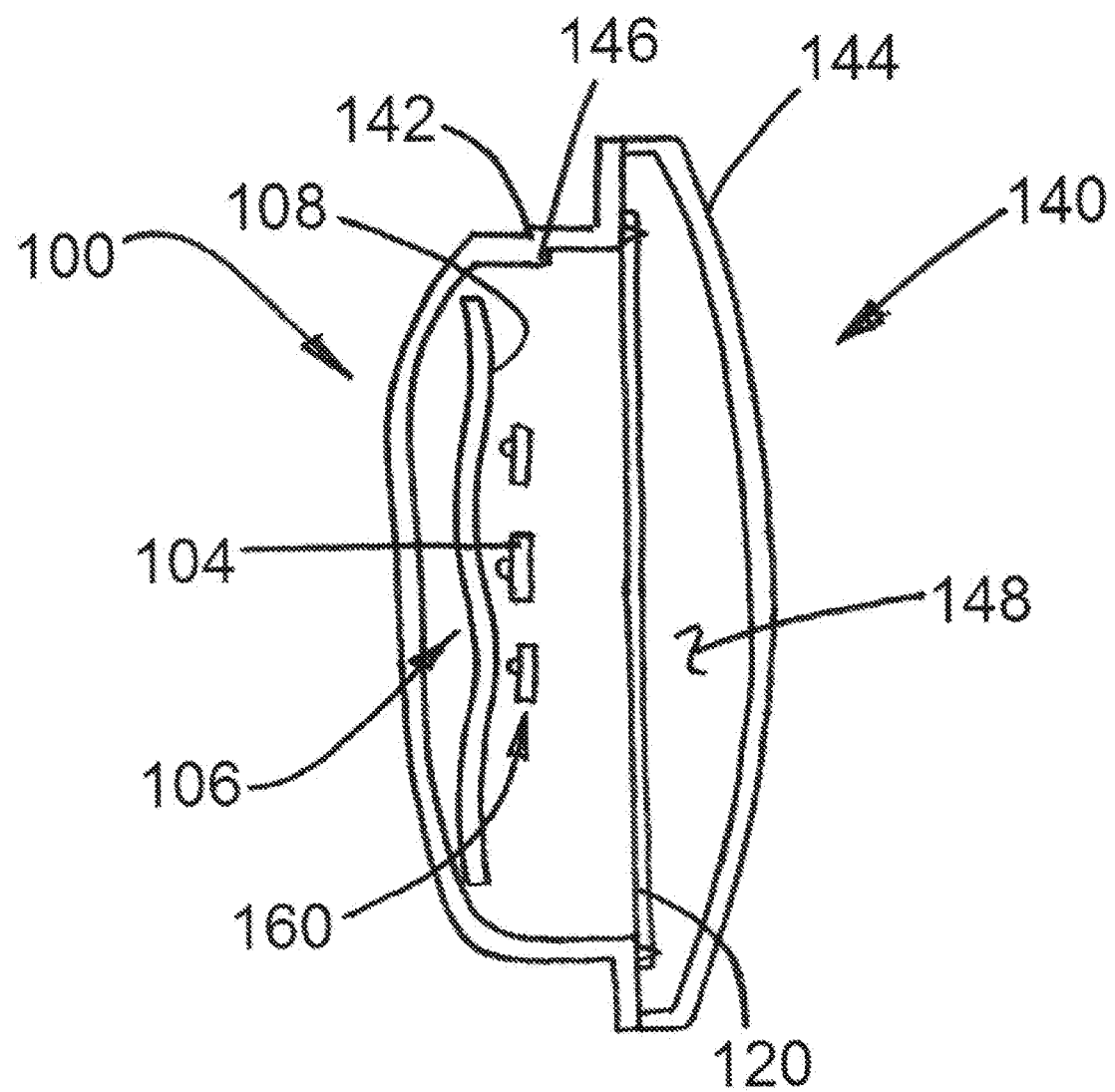
FIG. 5 shows a lamp assembly having two lenticular lenses, according to an exemplary embodiment of the present disclosure.

FIG. 5 shows an exemplary lamp assembly 140 of the present disclosure, similar to that shown in FIG. 3, but with only one lenticular lens 120 (such as one of lenticular lenses 120a, 120b shown in FIG. 3).

While various embodiments of lit image projection devices and lamp assemblies for the generation of three-dimensional images and methods to generate the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A projection device, comprising:
   one or more light sources;
   a rippled substrate defining a reflective surface, wherein the one or more light sources are oriented to direct light in a direction of the reflective surface, wherein at least part of the directed light is directed toward a furthest rear portion of the projection device such that at least one light source of the one or more light sources is directed perpendicular to the furthest rear portion of the projection device, the reflective surface configured to reflect light source light from the one or more light sources directed at it as reflected light;

a first lenticular lens configured to receive the reflected light from the reflective surface; and a second lenticular lens configured to receive the reflected light from the reflective surface;

wherein the reflected light received by the first lenticular lens and the second lenticular lens generates a three-dimensional lit image.

2. The projection device of claim 1, wherein the three-dimensional lit image appears as lightning.

3. The projection device of claim 1, comprising part of a lamp assembly, wherein the lamp assembly further comprises a housing and an outer lens, wherein the housing and outer lens define an inner volume and wherein at least part of the projection device is positioned within the inner volume, and wherein the three-dimensional lit image is present or perceived within the housing.

4. The projection device of claim 1, wherein the lamp assembly is configured as a vehicle lamp assembly.

5. The projection device of claim 1, wherein the first lenticular lens comprises or defines a plurality of flute optics or flutes, and wherein the flute optics or flutes have a convex shape.

6. The projection device of claim 1, wherein the one or more light sources comprise one or more light-emitting diodes.

7. The projection device of claim 1, wherein the rippled substrate comprises one or more ripples or waves therein, existing in a first direction and an opposite second direction.

8. The projection device of claim 1, wherein the second lenticular lens is positioned relative to the first lenticular lens such that a gap exists therebetween.

9. The projection device of claim 8, comprising part of a lamp assembly, wherein the lamp assembly further comprises a housing and an outer lens, wherein the housing and outer lens define an inner volume and wherein at least part of the projection device is positioned within the inner volume, and wherein the three-dimensional lit image is present or perceived within the housing.

10. The projection device of claim 8, wherein the lamp assembly is configured as a vehicle lamp assembly.

11. The projection device of claim 8, wherein the second lenticular lens comprises or defines a plurality of flute optics or flutes, and wherein the flute optics or flutes have a convex shape.

12. A projection device, comprising:
an array of light sources;
a rippled substrate defining a reflective surface, wherein the array of light sources is oriented to direct light in a direction of the reflective surface, wherein at least part of the directed light is directed toward a furthest rear portion of the projection device such that at least one light source of the array of light sources is directed perpendicular to the furthest rear portion of the projection device, the reflective surface configured to reflect light source light from the array of light sources directed at it as reflected light; and two or more lenticular lenses configured to receive the reflected light from the reflective surface;

wherein the reflected light received by the two or more lenticular lenses generates a three-dimensional lit image.

13. The projection device of claim 12, wherein the three-dimensional lit image appears as lightning.

14. The projection device of claim 12, wherein the array of light sources comprises one or more light-emitting diodes.

15. The projection device of claim 12, comprising part of a lamp assembly, wherein the lamp assembly further comprises a housing and an outer lens, wherein the housing and outer lens define an inner volume and wherein at least part of the projection device is positioned within the inner volume, and wherein the three-dimensional lit image is present or perceived within the housing.

16. The projection device of claim 12, wherein the lamp assembly is configured as a vehicle lamp assembly.

17. The projection device of claim 12, wherein the one or more lenticular lenses each comprise a plurality of flute optics or flutes, and wherein the flute or flute optics have a convex shape, and wherein the one or more light sources is/are positioned in between the rippled substrate and one of the one or more lenticular lenses.

18. The projection device of claim 12, wherein the one or more light sources are positioned to direct light toward the rippled substrate.

19. A lamp assembly comprising:
a projection device, comprising:
one or more light sources;
a rippled substrate defining a reflective surface, wherein the one or more light sources are oriented to direct light in a direction of the reflective surface, wherein at least part of the directed light is directed toward a furthest rear portion of the projection device such that at least one light source of the one or more light sources is directed perpendicular to the furthest rear portion of the projection device, the reflective surface configured to reflect light source light from the one or more light sources directed at it as reflected light;
a first lenticular lens configured to receive the reflected light from the reflective surface; and
a second lenticular lens configured to receive the reflected light from the reflective surface;
wherein the reflected light received by the first lenticular lens and the second lenticular lens generates a three-dimensional lit image;
a housing; and
an outer lens coupled to the housing to define an inner volume, wherein at least part of the projection device is positioned within the inner volume.

20. The lamp assembly of claim 19, wherein the housing and the outer lens are structured to establish and maintain a relative distance between the one or more light sources and the first lenticular lens, and wherein the rippled substrate comprises one or more ripples or waves therein, existing in a first direction and an opposite second direction.

* * * * *